United States Patent [19]

Fattinger et al.

[11] 4,312,646
[45] Jan. 26, 1982

[54] GAS SCRUBBING TOWER

[75] Inventors: Volker Fattinger, Arlesheim; Jüg Schneider, Muttenz, both of Switzerland

[73] Assignee: Ciba-Geigy Corporation, Ardsley, N.Y.

[21] Appl. No.: 77,705

[22] Filed: Sep. 21, 1979

Related U.S. Application Data

[63] Continuation-in-part of Ser. No. 960,502, Nov. 13, 1978, Pat. No. 4,251,236, and Ser. No. 963,555, Nov. 24, 1978, Pat. No. 4,210,428.

[30] Foreign Application Priority Data

Nov. 17, 1977 [CH] Switzerland ............... 14060/77
Oct. 20, 1978 [CH] Switzerland ............... 10877/78

[51] Int. Cl.³ .................................... B01D 47/12
[52] U.S. Cl. ............................. 55/218; 55/223; 55/227; 55/228; 55/229; 55/233; 55/421; 210/519; 210/534; 210/539; 210/540; 261/8; 261/22; 261/36 R; 261/111; 261/116; 261/DIG. 54
[58] Field of Search ............ 55/223, 218, 227–229, 55/233, 219, 257 R, 421; 261/8, 22, 36 R, 111, 116, DIG. 54; 210/519, 534, 539–540

[56] References Cited

U.S. PATENT DOCUMENTS

| | | | |
|---|---|---|---|
| 1,169,766 | 2/1916 | Brassert | 261/111 |
| 1,182,543 | 5/1916 | Ferguson | 55/233 X |
| 2,006,295 | 6/1935 | Chewning | 55/220 X |
| 2,014,044 | 9/1935 | Haswell | 55/229 X |
| 2,088,691 | 8/1937 | Dill | 261/DIG. 54 X |
| 2,100,813 | 11/1937 | Morgan | 210/534 |
| 2,874,850 | 2/1959 | Unthank | 210/540 X |
| 3,525,197 | 8/1970 | Sheehan | 55/233 |
| 4,001,116 | 1/1977 | Sckukogla . | |
| 4,157,250 | 6/1979 | Regehr et al. | 55/233 |

FOREIGN PATENT DOCUMENTS

| | | | |
|---|---|---|---|
| 2450719 | 4/1976 | Fed. Rep. of Germany | 261/36 R |
| 423918 | 3/1911 | France | 261/111 |
| 1283524 | 5/1962 | France | 55/223 |
| 23497 | of 1892 | United Kingdom | 55/240 |
| 972980 | 10/1964 | United Kingdom . | |
| 1459510 | 12/1976 | United Kingdom . | |

*Primary Examiner*—Kathleen J. Prunner
*Attorney, Agent, or Firm*—Harry Falber

[57] ABSTRACT

A gas scrubbing tower is described which has a top region, a sump region and at least two washing stages between these regions. The tower comprises gas entry means between the the sump region and the lowermost of the washing stages; gas exit means in the top region; a first washing stage, in the direction of gas flow through the tower, constituted by a layer of packing elements resting on supporting means in a cross-sectional plane; a first circulating line for wash liquid from the sump region to the layer of packing elements; a second, packing-free washing stage above the first washing stage; a second circulating line for conducting wash liquid through the second washing stage; a sludge separator, and conduit means for introducing water from outside the tower into a washing stage or into the sludge separator of the tower.

A process for operating the scrubbing tower is also described.

6 Claims, 11 Drawing Figures

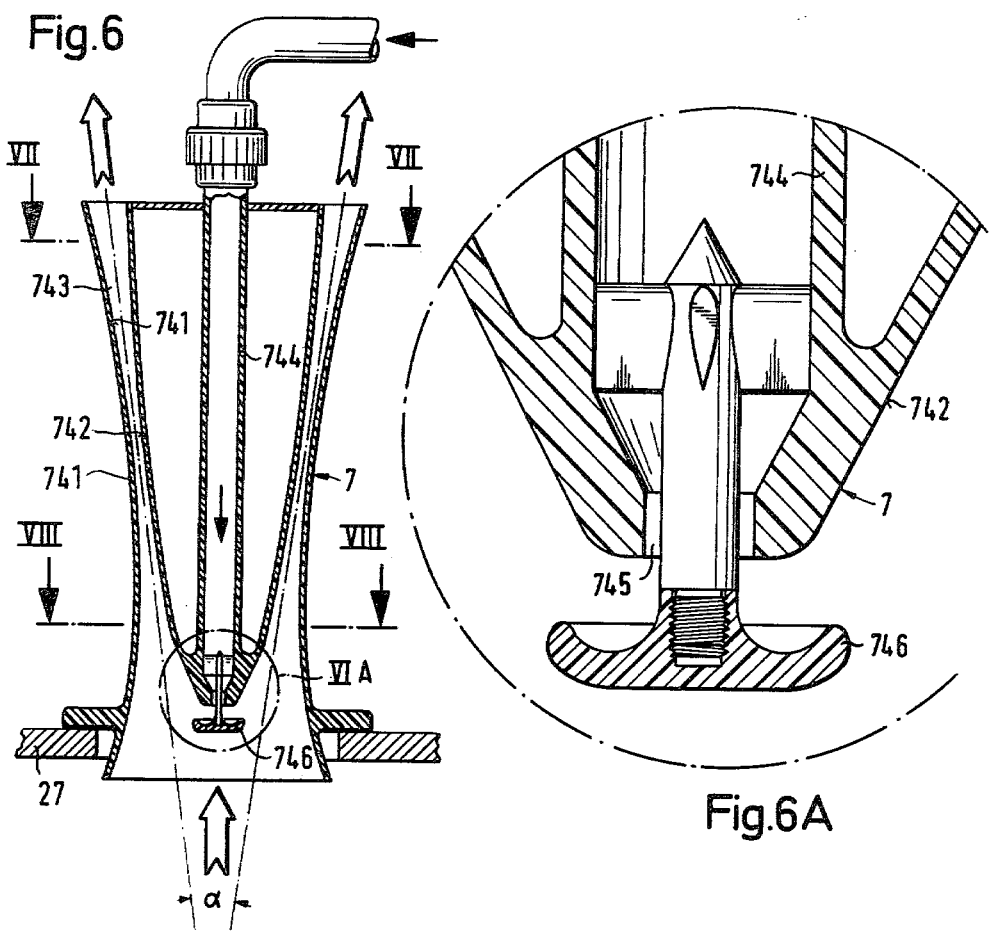
Fig. 6
Fig. 6A
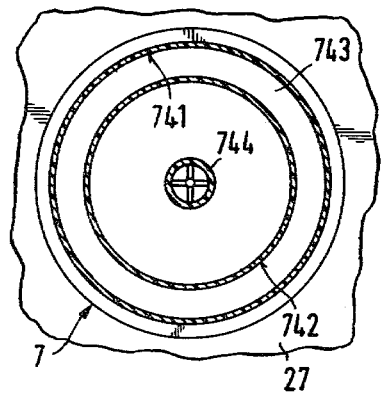
Fig. 7
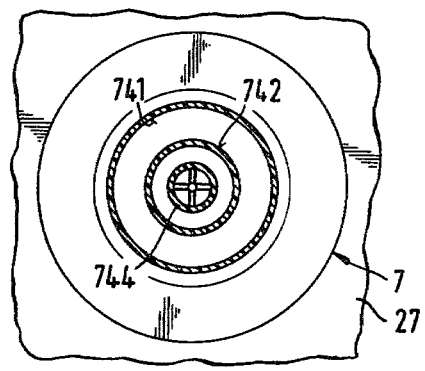
Fig. 8

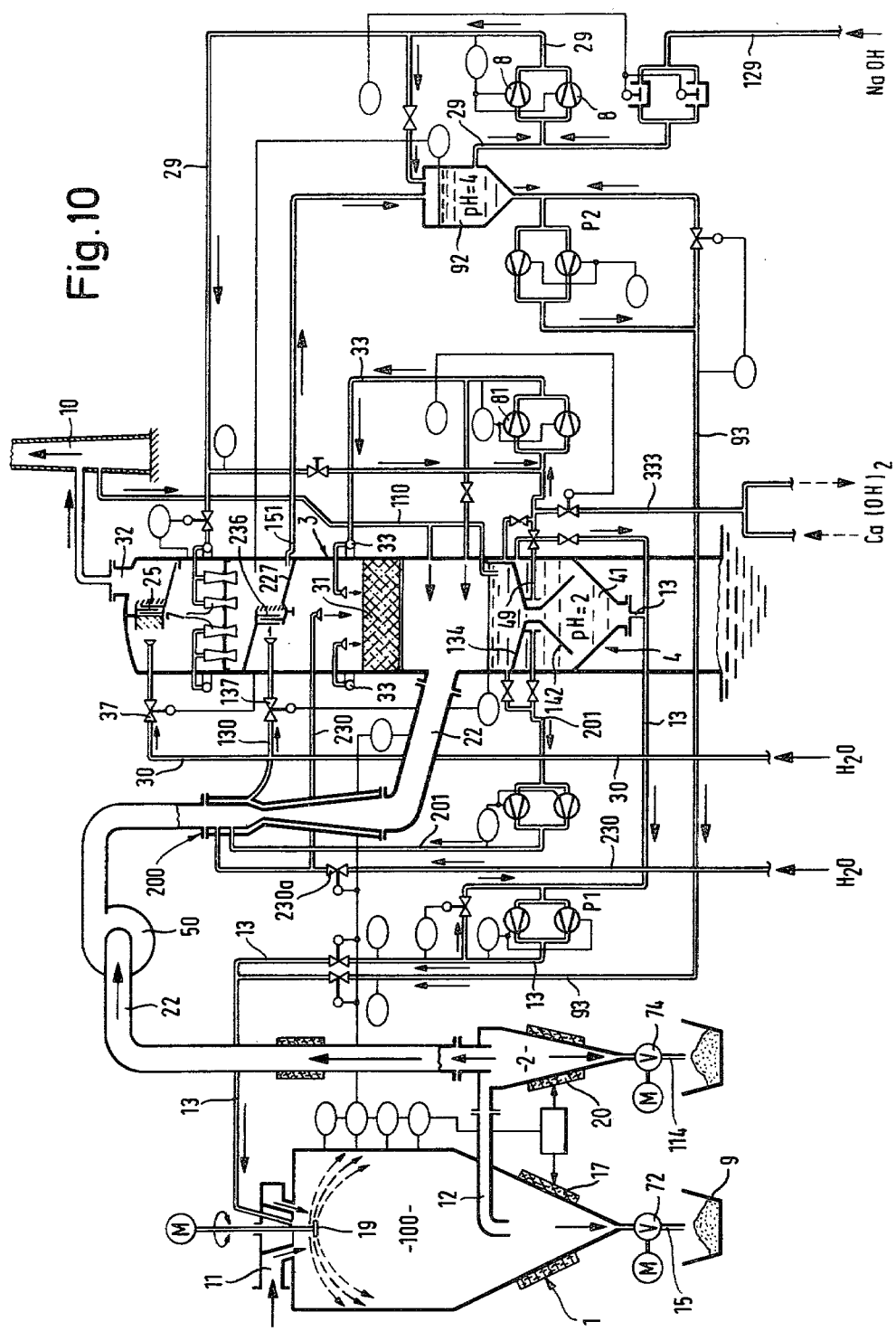

GAS SCRUBBING TOWER

RELATIONSHIP TO EARLIER APPLICATIONS

This application is a continuation-in-part of our pending patent applications Ser. No. 960,502 filed Nov. 13, 1978, now U.S. Pat. No. 4,251,236, and Ser. No. 963,555 filed Nov. 24, 1978, now U.S. Pat. No. 4,210,428.

BACKGROUND OF THE INVENTION

The invention relates to a gas scrubbing tower usable in a plant for purifying the off-gases from industrial furnaces, especially from waste incineration plants which scrubbing tower has several superimposed stages, in which acid, neutral and basic harmful substances (pollutants) in the gaseous form or in the form of a mist, are still present in the waste-gases after prior withdrawal of thermal energy and after separation of at least a substantial portion or all of the solid pollutants, by means of preliminary treatments. Gaseous pollutants as well as the remaining solid pollutants and pollutant mists (aerosols), present in the gas are removed in the scrubbing tower by means of wash liquid which is then cycled through a sludge separator or thickener, from which pollutants suspension can be withdrawn.

Preferably, the thermal energy is withdrawn from the waste gases prior to their introduction in the gas purification plant in an indirect heat exchanger, in particular a steam generator being indirectly heated by the off-gases, before these enter the scrubbing tower.

A plant of the above type for carrying out the purification of off-gases from industrial furnaces for the treatment of waste-gases, is describe in Austrian Pat. No. 225,163 and in German Auslegeschrift No. 2,408,223, both of Gottfried Bischoff Bau kompl. Gasreinigungs- und Wasserrückkühlanlagen KG, Essen, Germany.

The off-gases from waste incineration plants often have a high content of hydrogen chloride, stemming in particular from the combustion of polyvinyl chloride wastes, and, in addition, in particular a high content of $SO_2$. Moreover, their content of primary dust is usually high.

German Auslegeschrift No. 2,431,130 of Walther und Cie AG, Cologne, Germany describes a scrubber which operates in principle with alkaline wash liquids, especially those containing sodium ions and ammonium ions, whereby concentrated salt solutions are obtained in the scrubber and these are recycled in the gas purification plant.

In a further known plant according to U.S. Pat. No. 3,929,963 of S.I. Taub (E.I. DuPont de Nemours and Company) the solid pollutants are removed from the waste-gas as completely as possible, by which means the need for a slurry separator can be avoided, whereupon the waste-gases, which have been substantially free from solid pollutants, are then subjected to scrubbing by means of a wash solution, the pH value of which in the scrubber or in the return line from the scrubber to the evaporative cooler can be so adjusted, by adding salt-forming chemicals, that a water-soluble or water-insoluble salt is formed with the gaseous acids or with other, basic pollutants taken up by the wash liquid.

Gas scrubbing towers containing several packing layers which extend each transversely to the perpendicular tower axis, and which layers are spacedly superimposed one above the other, in which towers the waste gas is introduced beneath the lowermost packing layer and the purified gas exists at or near the top end of the tower, have been described in numerous publications, for instance in U.S. Pat. No. 2,523,441 to Paul E. McKamy issued Sept. 26, 1950, French Pat. No. 1,469,230 to Metallgesellschaft, A.G. published Feb. 10, 1969.

U.S. Pat. No. 3,768,234 to Leslie C. Hardison, issued Oct. 30, 1973

German Offenlegungsschrift No. 26 43 211 to Gewerkschaft Keramchemie, publ. Apr. 6, 1978, and others.

Each packing layer consists of a large number of packing elements. "Hedgehog" type bodies as illustrated in FIG. 3 of a special printing of "Probleme der nass-mechanischen Abscheidung feiner Partikeln aus Gasströmen" taken from "Chemische Rundschau" 20(1975) No. 18 published by Chemie-Verlag Vogt-Schild AG, Solothurm, Switzerland are preferred.

More advanced scrubbing tower installations comprise at least one of the flue gas washing towers of the type described by Fattinger, Schmitz and Schneider in Publication No. 107 "Technik der Abgasreinigung" ("Technology of Off-gas Purification") of the "Tagung Lufthygiene 1976" ("Conference on Air Hygiene 1976") of Dec. 3, 1976 published by Verein zur Förderung der Wasser- und Lufthygiene (VFWL) of Huttenstrasse 36, 8006 Zürich, Switzerland (see FIGS. 1 to 4 and 10 therein).

A particularly advantageous tower of this type having a combination of a packing layer and an X-slot-separator is described in FIG. 10 of the last-cited publication.

These known towers suffer from a number of drawbacks which increase the cost of operation of the plants and increase the consumption costs for chemicals to an economically highly undesirable extent.

Thus, in all of these known plants, there is a sump at the bottom of the tower in which wash liquor charged with solid particles and/or scum collects, and often this wash liquor is then discharged into a settling tank and may be circulated from there to a sludge filter and back into the same settling tank. Supernatant liquor is then drawn off from the top sidewall of the settling tank and recirculated into one or several wash stages in the scrubbing tower.

The total amount of water taken up by the stream of waste-gas in the scrubber firstly results in a considerable increase in the volume of as to be purified and thus in a substantial, expensive increase in the size of the scrubbing tower and, secondly, in the formation of an undesirably intense plume of condensed water vapour at the outlet of the chimney from which the purified off-gases are released into the surrounding air.

Whilst the main object of the scrubbing tower is, in particular, to remove gaseous pollutants such as HCl, HBr, $H_2F_2$, $Cl_2$, $Br_2$ and $SO_2$ and also sulphuric acid mists from the off-gas, a further important function of the scrubber is to cool the gases, whereby intially gaseous tar-like substances and also salt-like substances can be condensed and then precipitated.

However, this treatment frequently causes precipitates on the walls of the various washing stages in the scrubber and also in the sludge separator, which precipitates form crusts or caking on these walls and in the outlets from the scrubber and impair the functioning of the entire washing apparatus to an increasing degree the longer the apparatus is in operation. These incrustations or caking consist, for example, of gypsum, lime, metal salts and other solids.

OBJECTS AND SUMMARY OF THE INVENTION

A principal object of the invention is, therefore, to provide an improved scrubbing tower in which the danger of deposits on the walls of the tower and ensuing clogging of the apparatus, is substantially avoided and, as a result, the operation of the scrubbing tower between cleaning phases is substantially facilitated.

A further object of the invention is to provide a process for purifying off-gasses in the scrubbing tower described initially, which tower likewise permits the production of clear effluents which have a low degree of contamination and can be disposed of easily.

Furthermore, it is an object of the invention to keep the amount of chemicals required for a plant comprising the scrubbing tower according to the invention, and in particular in the latter, as far as possible, lower than that in known gas purification plants, and to reduce or suppress the formation of incrustations or caking, in particular in the apparatus of the scrubber.

These objects are attained in accordance with the invention by an advanced type of a scrubbing tower as described hereinbefore having a top region, a sump region and at least tow washing stages therebetween, which tower comprises (1) a gas entry means for introducing waste gas to be scrubbed into the tower, which entry means are located between the sump region and the lowermost of the washing stages, (2) gas exit means in the top region of the tower for the discharge of purified gas therefrom, (3) a first washing stage, in the direction of upward gas flow from said entry means to the exit means, which stage is constituted by at least one layer of packing elements, which layer extends in a horizontal plane across the cross-sectional area of the tower, and by supporting means for the packing elements, (4) a first circulating line for wash liquid from the sump region, comprising pump means, and spray nozzles which are positioned in the first washing stage for irrigating the layer of packing elements therein, (5) a second, packing-free washing stage, located in the scrubbing tower above the first washing stage, (6) a second circulating line for conducting wash liquid through the second washing stage, (7) a sludge separator, constituting the said sump region of the tower, and comprising a settling vessel having an upper portion, a central portion and a base portion, the upper portion comprising an upper inner partition wall which tapers conically inwardly and with its apex downwardly to define a central orifice; an inlet tube for sludge-carrying liquid from said first washing stage and extending via the central orifice into the central portion of the settling vessel;

a first outlet comprising a tube for removal of liquid of reduced sludge content and extending, from the central region of the settling vessel above the lower end of the inlet tube; radially toward the outside as part of the first circulating line; and a second outlet for removal of liquid charged with sediment from the base portion of the settling vessel; and (8) conduit means for introducing water from an extraneous source into the scrubbing tower.

Preferably, such water is introduced into the settling vessel of the sludge separator, and/or it is introduced into the washing stages of the tower, especially for irrigating drip catchers provided therein.

Withdrawal of wash liquor from the central region of the settling vessel about the inlet tube and above the lower end of the latter which is preferably equipped with a downwardly open conical outlet wall, permits obtainment of a particularly clean phase of the liquor and withdrawal is effected more rapidly at that point than if the wash liquor is withdrawn in the conventional manner from the upper peripheral zone of the settling tank. The largely or completely sludge-free water can then be recycled into the spray nozzles, provided in the first circulating line, in a particularly clean state, thus avoiding clogging of the fine spray nozzle openings, and augmenting the scrubbing effect of the wash liquor recirculated into this stage.

Preferably, a deflector is mounted at the lower open end of the inlet for liquid, of the sludge separator, and opposes the flow of liquid through that inlet tube.

The sludge separator further comprises a conical funnel which widens downwards and is connected with the lower end of the inlet tube.

The first outlet of the sludge separator preferably comprises a conduit having an intake opening and a cup-shaped casing containing in its bottom said intake opening of the said conduit and being positioned about the inlet tube for liquid, the conduit thus being adapted for receiving wash liquid rising along the outside of the conical funnel at the lower end of the inlet tube.

The sludge separator can further comprise an inner annular baffle underneath the upper inner partition, which baffle tapers conically inwardly with its apex pointing upwardly and defining a central baffle orifice through which the inlet tube for liquid extends downwardly from the central orifice of the upper inner partition wall, while an annular gap being a part of the central baffle orifice is left free about the inlet tube of the sludge separator, thereby permitting overflow of scum-free or scum-carrying liquid through the gap and over the outer surface of the baffle.

Preferably, the sludge separator further comprises a two-position level controller, between two levels in the settling vessel of the sludge separator, of which the lower level lies a short distance above the point at which the outlet tube opens into the settling vessel, while the upper level lies a short distance below, or at, the central orifice of the upper conically tapered partition, and the level controller is adapted for keeping the level of liquid between the two levels in the settling vessel.

Furthermore, the sludge separator can comprise a scum outlet tube connected to the outlet for liquid charged with sediment, and a scum collecting vessel adapted for collecting scum which overflows from the said gap of the central baffle orifice down the upper face of the conically tapered baffle when the level of liquid in the settling vessel is raised to the said upper level.

In a preferred embodiment, the scrubbing tower according to the invention comprises a wash liquid separating stage, and the second washing stage comprises a plurality of slot-defining gas flow-baffling elements adapted for accelerating and then decelerating gas flow therethrough, and means for introducing a liquid into these elements, wherein each said element has a slot inlet thereto and a slot outlet therefrom and includes two coaxial guide surfaces defining an annular passage diverging from the slot inlet toward the slot outlet, the mean angle of divergence being in the range of 10° to 90°, and the cross-sectional area of the annular passage decreasing in the direction of gas flow from the slot inlet and then increasing towards the slot outlet and the mean radius of the cross-sectional area increasing in the direction towards the slot outlet, the liquid introduction means including means to produce a rotationally symmetrical liquid jet substantially parallel to said guide surfaces and in the same direction as the flow of gas through each element and comprising a deflector disc centrally disposed on the gas inlet side of the element and an axial feed tube through which liquid is fed onto the deflector disc in a direction opposite to that of the gas flow and is then deflected by the deflector disc rotationally symmetrically into the direction of the gas flow.

When operating the scrubbing tower according to the invention, the pH value of the liquid phase in the slurry separator and in each of the gas wash stages of the scrubber directly upstream of the separator is, as a rule, kept below 4.

Operating the said scrubber in a pH range below 4 substantially or completely avoids the undesired formation of crusts or caking, mentioned hereinbefore, in the wash apparatus and in the sludge separator.

The content of acidic pollutants which has remained in the waste-gases when introduced into the scrubbing tower should preferably be sufficiently high to afford in the scrubber a pollutants suspension which has an acidic pH value, preferably below 4.

The proportion which can be evaporated, of the liquid phase of the pollutants suspension to be discharged from the sludge separator, should be at least 70, but preferably at least 90, percent by weight.

Preferably, the pH value of the wash liquid in the lowermost wash stage of the scrubbing part proper in the sludge separator which is connected directly therebeneath, should be kept above 1 and preferably between 2 and 3.5. It is possible to save chemicals by adjusting the pH value to this range, when care is taken that the proportion of solid pollutants, precipitated from the waste-gases before passing into the scrubber, is only such that the proportion of these pollutants (for example metal oxides) which remains in the off-gases suffices to keep the pH value of the wash liquid within the desired range of pH values without the addition of basic chemicals (for example sodium hydroxide solution) or with only a small addition of such chemicals.

Whilst the pH value of the wash liquid which is cycled via the washing stages and through the sludge separator must, as a rule, be kept at a pH value of below 4, the pH value of the suspension or solution of harmful substances which is withdrawn form the slurry separator can also be adjusted to above 4.

The pH value should preferably be only so far below 4, but above 1, that the content of acidic pollutants in the waste-gas released from the plant, which content increases with increasing acidification of the circulating wash liquid during the washing process due to the resulting decrease in absorptive capacity of the said liquid for these pollutants, remains below a certain limit value which is to be maintained in the operation of the plant; this limit value, in turn, should usually be as far as possible below any minimum level which may have been legally prescribed for acidic pollutants in waste-gas released into the atmosphere.

Furthermore, a slurry phase (pollutants suspension) which has a low content of pollutants and is of very low viscosity can be withdrawn from sludge separator.

The wash liquid in the plant can be kept extremely clean and suspensions of pollutants are obtained which are particularly easy to pump and which permit trouble-free use of packed wash towers and X-separators in the scrubber, i.e., without causing any blockages, as would be expected with the dirty slurry phases and effluents from the known processes.

In industry, the said "pollutants suspensions" are also termed "slurries". They are aqueous suspensions of solid pollutants, which pollutants are described more in detail below, or aqueous emulsions of liquid, water-insoluble pollutants, or aqueous mixtures which consist of such a suspension and emulsion, of relatively low viscosity and of a density which is preferably about 1 and up to about 1.3 g/ml.

If the pollutants are water-soluble, they are in solution in the aqueous phase of the "pollutants suspension" and, above the saturation point, the excess of water-soluble pollutants is in suspension.

Pollutants which are to be removed from industrial waste-gases with the aid of the scrubber according to the invention are not only those pollutants which can be collected by the conventional dry purification of flue gases by means of electrofilters and which, at the temperatures prevailing in the electrofilter, condense to sufficiently coarse dust or mist particles, but also oils or tar-like substances and also that portion of the metal oxides or salts, contained in the flue gas, which forms an aerosol only when the waste-gases are cooled upon issuing from the stack of the plant and thus lead to contamination of the environment, and, furthermore also harmful gases such as HCl, $H_2F_2$ or $SO_2$, which cannot be separated off by means of an electrofilter.

The water which is to be added to the improved scrubber according to the invention as a replacement for the amounts of water removed from the plant together with the purified off-gases can be fresh water or waste water and can therefore be fed-in at various points into the scrubber, either as fresh water, or as waste water, or as an aqueous suspension of solid pollutants and/or as an aqueous emulsion of liquid pollutants of the type mentioned further above.

The separation of the pollutants suspension from the wash liquid takes place in a separating means which in this specification is termed a "sludge separator" for reasons of brevity. It replaces the apparatus termed a "Thickener" in German Auslegeschrift 2,408,222. A novel type of sludge separator constructed by Jürg Schneider is used and the construction and mode of operation of this separator are described in more detail below.

If the water-gas enters the scrubbing tower at too high a temperature (above 170° and at most 200° C.), then too much water will be evaporated from the wash liquid in the tower, and become entrained in the waste-gas and removed from the plant, and the concentration of pollutants in the pollutants suspension will be too high and the wash liquid will therefore be too dirty, which results in an inadequate purifying effect when this liquid is recycled through the scrubber. The wash liquid can even become supersaturated with salts, so that salt crystallisation in the scrubber can in some cases result in choking up the latter.

Preferably, the waste-gases to be purified are introduced into the scrubbing tower at a temperature in the range from above 120° to 170° C.

The preferred mode of operating the scrubbing tower according to the invention in practice demands that the pH value of the liquid in the slurry separator and in the gas washing stage or stages of the scrubber directly upstream of this separator remain below 4, i.e. that no basic neutralising agents, or only very small amounts of basic neutralising agents (e.g. sodium hydroxide solution) be added to the wash liquids or (e.g. lime water) to the pollutants suspension, whilst in known processes, for example that of German Auslegeschrift No. 2,431,130 of Walther und Cie AG, Cologne, Germany, the acid components of the off-gases, in particular $SO_2$, must be fully neutralized to the corresponding, preferably water-soluble, salts by chemical reaction with an alkaline solution. In this known process, the pH value of the liquid in the work cycle should be between 4.0 and 7.8, but in practice below a pH of 6.5 only when the proportions of acid components are very small, while as a rule it should be between 6.5 and 7.5, i.e. substantial amounts of basic substances are required. However, in the process according to the invention, operation at a pH value above 7 would easily result in precipitates in the scrubber plant to such a degree that the entire plant would be blocked.

The scrubbing tower of the present invention is preferably operated with a highly acid wash liquid having a pH value of below 2, in the sludge separator and in each wash stage directly upstream thereof, thus saving costs for alkaline chemicals.

Only if the HCl content and $SO_2$ content of the waste-gases to be purified is particularly high (above 2 g/Nm$^3$ of $HC1 + SO_2$) is it advisable partially to neutralise the concentrates of pollutants, which can be recycled continuously from the scrubber to an injection point into the waste-gas flow upstream of the scrubbing tower, to a pH value of 2 to 4 before they enter the latter. The recycled pollutants suspension can even be somewhat alkaline, but only to such an extent that it is subsequently rendered acid again (pH value less than 4) in the scrubber, due to the content of acid pollutants in the waste-gases.

A combination of two measures in the scrubbing tower according to the invention, namely, maintaining the wash liquid at a pH value below 4, and holding the vaporisable proportion of the liquid phase of the pollutants suspension recycled into the waste-gas stream at least at 70, but preferably at 90 or more, percent by weight, is preferred in its operation. The installations of the scrubber can be constructed of synthetic plastic material, in a modern manner.

A scrubbing tower charged in the first washing stage with a single packing layer is advantageously used in the scrubber, when the velocity of the gas flowing through the scrubber is greater than one m/sec. The packing layer preferably consists of the above-mentioned hedgehog packing units (see FIG. 7 of the above-mentioned description of the Verein für Wasser- und Lufthygiene, [VFWL], Zurich). The free cross-sectional area of the scrubbing tower through which the off-gas flows is advantageously so chosen that the gas speed is more than one m/sec.

Furthermore, the scrubber advantageously contains a wet-mechanical mist and dust (aerosol) separator having a gas resistance of 5 to 60, and preferably of 10 to 30 mbars. The aerosol separator used is preferably a X-separator, which is also described in the said publication by the VFWL, Zurich (FIGS. 2 and 3).

Preferably, more than 50% by volume of the circulating liquid, which flows through the first gas wash stage downstream, in the direction of gas flow, from the mechanical dust remover, is fed through a settling container of the sludge separator (thickener), but optionally from 70 to 100% of the said liquid are fed through the container, the sojourn time of the liquid in the settling container of the sludge separator being, depending on the size of the latter, preferably between 1 and 8 minutes, but optionally from 3 to 5 minutes.

The waste water used to replace water removed from the plant together with the off-gases is preferably slag-quenching water from a waste incineration plant. This waste water can be fed into the wash liquid cycle but is preferably fed into the sludge separator.

Finally, a heat exchanger can be inserted in the wash liquid cycle of the scrubber; this heat exchanger cools the wash liquid and releases the heat withdrawn therefrom, preferably in a heat pump system, via a second heat exchanger to the conventional auxiliary air, which is thereby heated up and is then mixed in to dilute the purified off-gases in the stack of the plant.

It is also possible to meter into the pollutants suspension which is to be recirculated into the waste-gas flow upstream of the scrubber from the sludge separator and which may have been partially neutralised as mentioned above, a binder and/or a chemical constituent which binds the salts present therein in the solid phase of the pollutants and also at the same time reduces their solubility in rain water, this constituent being, for example, a silicate, such as waterglass.

BRIEF DESCRIPTION OF THE DRAWINGS

Further details of the invention can be seen from the following description in conjunction with the appended drawings, in which

FIG. 6 is a schematic longitudinal sectional view of one of the ring-slot-defining elements shown in FIG. 4;

FIG. 6A shows a detail of VI A in FIG. 6 on an enlarged scale;

FIG. 7 is a cross-sectional view taken in a plane indicated by VII—VII in FIG. 6;

FIG. 8 is a cross-sectional view taken in a plane indicated by VIII—VIII in FIG. 6;

FIG. 10 is an enlarged sectional view of the embodiment shown in FIG. 9.

DETAILED DESCRIPTION OF THE EMBODIMENTS SHOWN IN THE DRAWINGS

Figure 1:
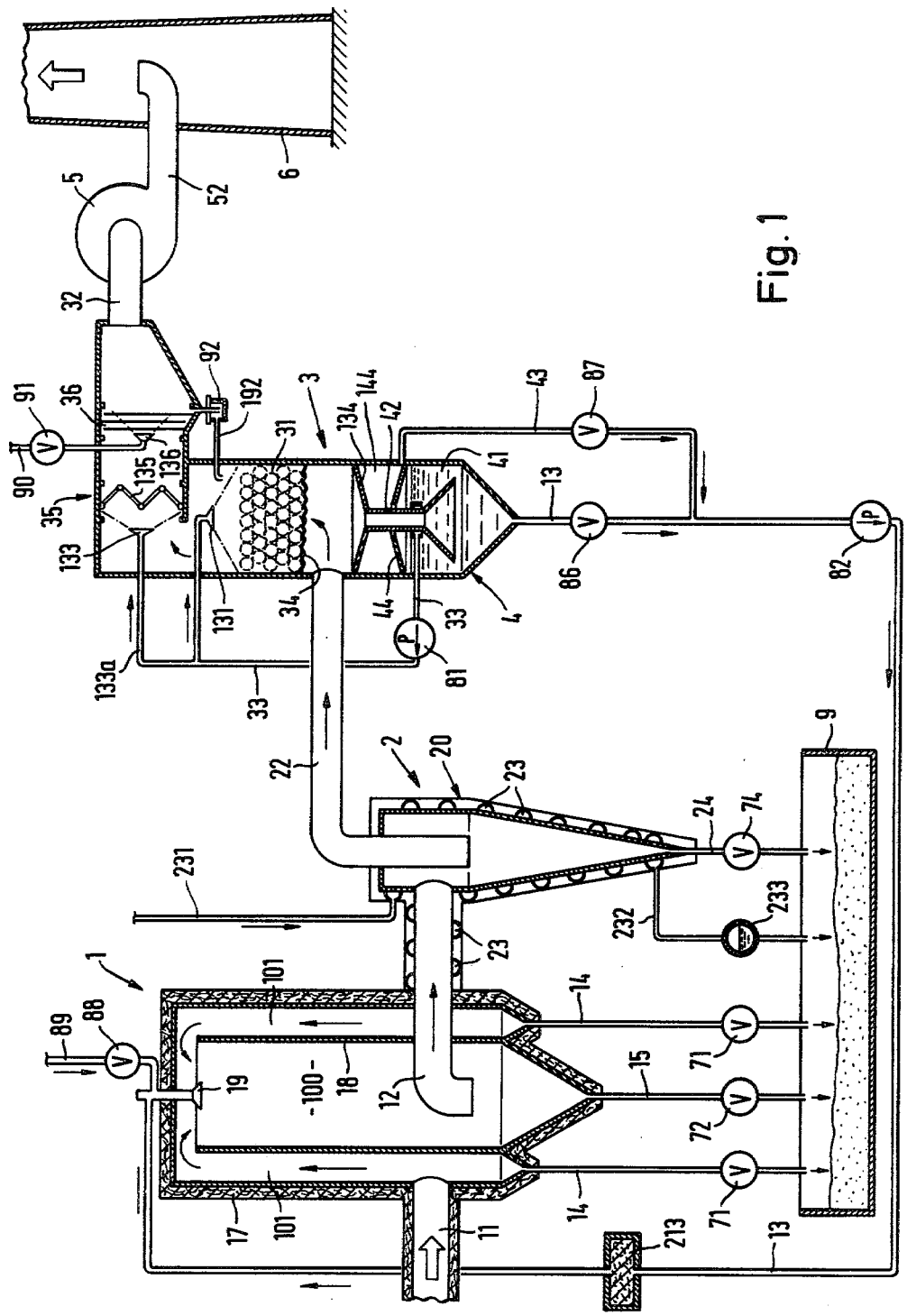
FIG. 1 shows schematically, as an example, a waste-gas purification plant comprising a first embodiment of the scrubbing tower of the invention.

The plant shown in FIG. 1 comprises an evaporative cooler 1, the outer walls of which are surrounded by an insulating jacket 17. In the interior of the evaporative cooler 1 there is provided a cylindrical partition 18, which separates a mixing and reactor space 100 from an outer annular chamber 101 which surrounds this space. An off-gas feed line 11 for feeding the off-gas to be purified into the plant opens into this outer annular chamber 101. The cylindrical partition 18 has openings at its upper end which establish free communication between the mixing chamber 100 and the outer toroidal chamber 101. An atomizer nozzle 19, through which liquid can be sprayed into the mixing chamber 100, is provided at the upper end of the latter. An off-gas line 12 leads from the lower region of the mixing chamber 100 into a cyclone dust remover 2. The walls of the off-gas line 12 and the outer walls of the cyclone dust remover 2 are surrounded by a heating jacket 20, in which coils of semi-cylindrical tubes 23 are provided for heating the cyclone dust remover and the off-gas line 12. An outlet line 15 is located at the lower end of the mixing chamber 100, outlet lines 14 are located at the lower end of the annular chamber 101 and an outlet line 24 is located at the lower end of the cyclone dust remover 2; precipitates from the off-gas can be run off, in solid or liquid concentrated form, through these lines from the evaporative cooler and from the cyclone dust remover 2 into a dust collection vessel 9.

Running off is preferably effected batch-wise and is controlled via valves 71, 72 and 74, which are provided in the lines 14, 15 and 24 respectively. The semi-cylindrical tubes 23 are heated by means of superheated steam, which is introduced via a steam line 231. Water which condenses in the semi-cylindrical tubes is run off continuously via a condensate line 232 into a condensed water collector 233.

A gas transfer line 22 leads from the upper region of the cyclone dust remover 2 into the central region of a wash tower 3 of a scrubber.

Figure 3:
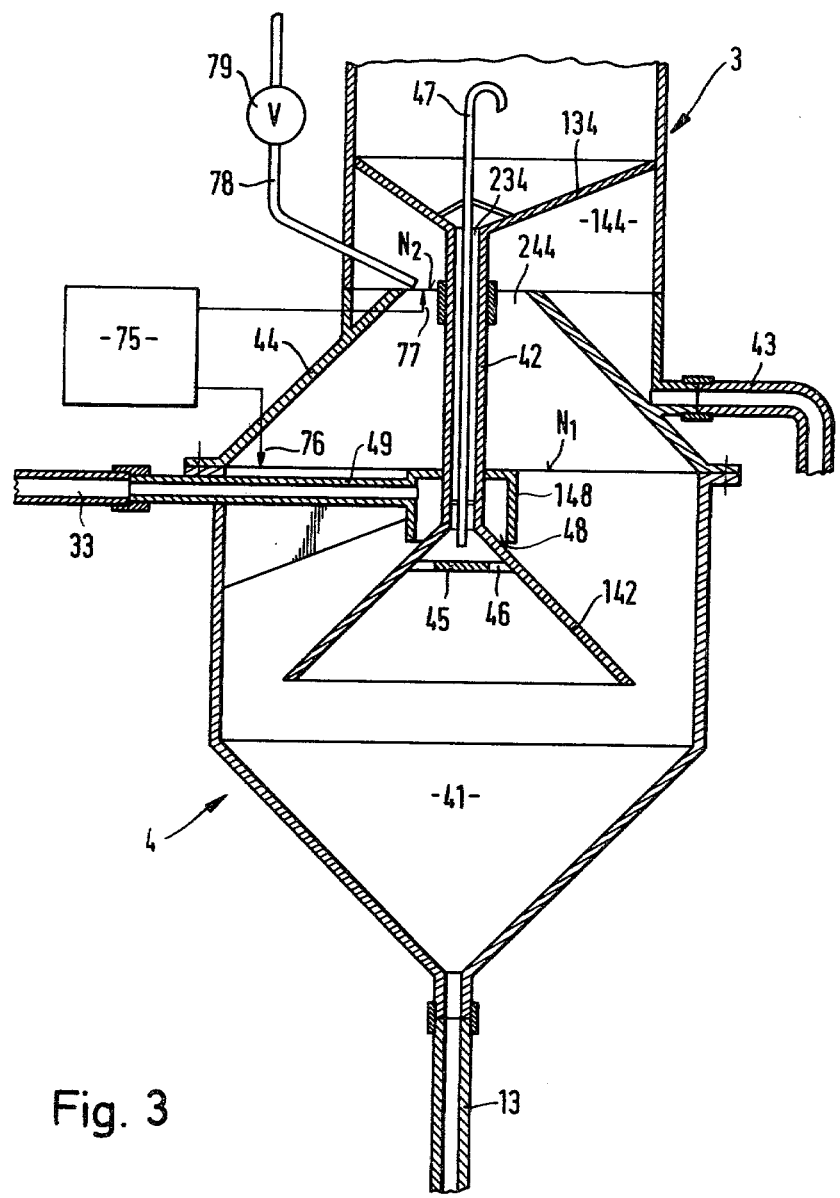
FIG. 3 shows a schematic representation of a longitudinal section through another, preferred embodiment of the sludge separator in the scrubbing tower according to FIGS. 1 and 2.

The central region of the tower 3 is filled with a layer 31 of packing units, which rests on a transverse grate 34. An injection nozzle 131, which is used to spray the packing layer 31 with wash liquid from a liquid circulating line 33, is located above the packing layer 31 in the wash tower 3. An aerosol separator 35, preferably a X-separator, is placed above the layer 31 in the upper part of the wash tower 3 and the slotted wall 135 of the aerosol separator 35 is sprayed via a spray nozzle 133 with wash liquid which is fed to the nozzle 133 from the circulating line 33 via the branch line 133a. The aerosol separator 35 is in free communication, on the one hand, with the interior of the wash tower 3 and, on the other hand, through the slotted wall 135, with a mist collector 36. A spray nozzle 136, into which a fresh water feed line 90 provided with a shut-off valve 91 opens, is arranged in front of the mist collector 36. The fresh water sprayed in via the spray nozzle 136 rinses the walls of the mist collector 36 and collects in a collection vessel 92 from which it flows via the line 192 into the wash tower 3 above the packing layer 31. A gas line 32 for the purified off-gas leads from the mist collector 36 via a fan 5 into a gas outlet line 52, which opens into a stack 6. A sludge separator 4, the construction of which is described further below in more detail in connection with FIG. 3, is located at the lower end of the wash tower 3.

Wash liquid is pumped from the sludge separator 4 by means of a pump 81 through the circulating line 33 to the nozzles 131 and 133.

The settling container 41 of the sludge separator 4, which is filled by wash liquid, has, at its upper end, a conical partition 44 which is tapered upwards and towards the centre.

The wash liquid, from the nozzle 131, which trickles downwards in the tower 3 collects on the base 134, which is inclined conically downwards towards the centre of the wash tower 3, and flows from there through an outlet line 42, which extends through the opening 244 in the centre of the partition 44 downwards into the settling container 41. A scum outlet 43 leads from the annular space 144, which is located above the partition 44 and below the base 134, via a shut-off valve 87 downwards and joins with a slurry line 13 which leads from the lower end of the settling container 41 of the sludge separator 4 downward via a non-return valve 86.

After joining with the line 43, the line 13 leads via a circulation pump 82, and via a sieve or filter 213 to the upper end of the evaporative cooler 1, where it is connected to the injection nozzle 19. The injection nozzle 19 is designed as a two-component nozzle, and air or steam can be blown in as the atomising medium via a line 89 and a shut-off valve 88.

In FIGS. 2 to 6, the parts corresponding to the elements of the apparatus in FIG. 1 are characterised by the same reference numbers as in FIG. 1.

Figure 2:
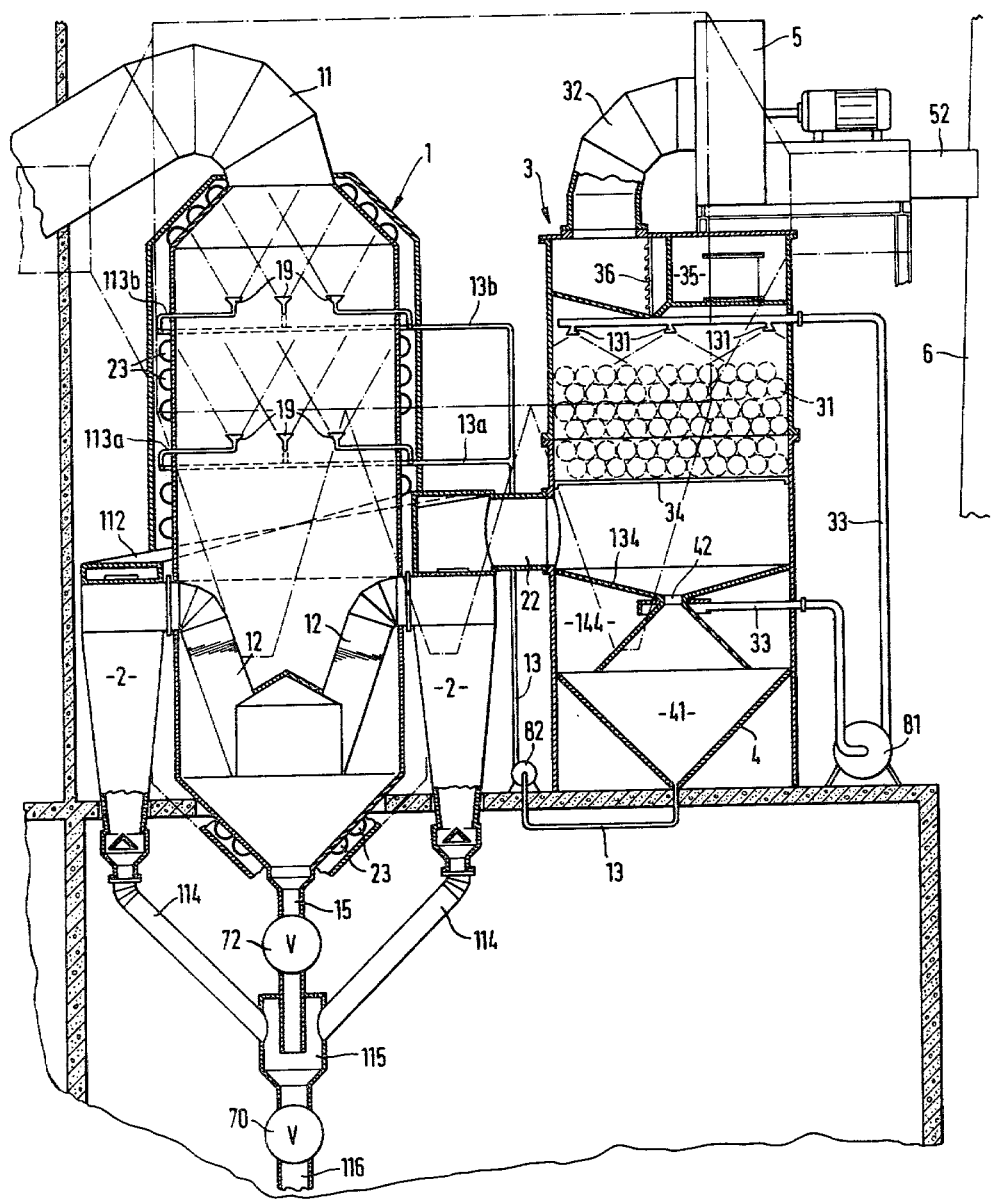
FIG. 2 shows schematically a preferred practical arrangement of the embodiment of the scrubbing tower in the plant shown in FIG. 1, in a side view.

In the embodiment according to FIG. 2, the evaporative cooler 1 is designed as a cylindrical container. The feed line 11 for the off-gases to be purified in this case opens into the upper end of the evaporative cooler 1, whilst a number of nozzles 19 in a lower position are fed by the branch line 13a, which branches off from the slurry line 13, via a ring line 113a, and a number of nozzles 19 in a higher position are fed by the branch line 13b, which branches off from the line 13, via a ring line 113b.

In this embodiment, the nozzles 19 direct the liquid spray cone upwards, that is to say towards the off-gas flowing in through line 11.

Ten cyclone dust removers 2 are arranged around the lower region of the evaporative cooler 1, and the offgas which leaves the evaporative cooler 1 in its lower region is fed into these cyclone dust removers via ten lines 12. The off-gas, from which the dust has been removed dry in the ten cyclone dust removers 2, passes via a loop line 112 into the gas transfer line 22, throttling of the stream of gas in line 12 being prevented by the fact that the cross-sectional area of the ring line 112 gradually widens towards the last-mentioned line 12. An outlet line 15 for agglomerates of pollutants, which is provided with a shut-off valve 72, is located at the lower end of the evaporative cooler 1, in the same manner as in the embodiment according to FIG. 1.

The lower ends of the cyclone dust removers 2 are connected to outlet lines 114 which, together with the line 15, end in a collection vessel 115 which can be emptied by means of a line 116 provided with a shut-off valve 70.

The off-gas transfer line 22 is connected in the same way as in the plant according to FIG. 1 to a wash tower 3 of the scrubber, which is equipped in the same way as that in FIG. 1.

The preferred embodiment of the sludge separator 4 shown in FIG. 3 comprises a settling container 41 and a liquid feed line 42, which extends, through the central opening 244 in a partition 44 which is tapered conically towards the top and extends towards the centre, into the settling container 41 and is connected, by means of its upper end, to the outlet orifice 234 of the base 134 of the wash tower 3 which base slopes conically inwards and downwards.

At its lower end, the line 42 carries an outlet funnel 142, which widens conically downwards and outwards and is open at the bottom; in the interior of funnel 142 a deflector 45 is fastened, opposite the line 42 and vertical to the end of the line 42, by means of struts 46.

A vent tube 47 is fitted centrally in the feed line 42 by means of struts and the upper open end of this tube ends above the base 134, and the lower open end thereof a short distance above the deflector 45.

The inlet orifice 48 of an outlet connecting branch 49, to which the recirculating line 33 for the wash liquid is connected outside the sludge separator 4, is located in the central region of the container 41 in the lower wall of an inlet casing 148, a short distance above the outlet funnel 142.

The parition 44 projects into the lower open end of the wash tower 3 which is fitted on the upper region, surrounding the orifice 244, of the separator 4, and which encloses the annular space 144. A two-position level controller 75 is connected to the sludge separator 4 and, of the two measuring heads or probes 76 and 77 of the controller, the lower measuring head 76 responds when the liquid in the container 41 has fallen to level $N_1$, whilst the upper probe 77 responds when the liquid in the container 41 has risen to the upper limiting level designated $N_2$.

The procedure for operation of the sludge separator 4 is that wash water first flows from the wash tower 3 through the feed line 42 into the container 41 and fills the latter, with the pump 81 inactive and with the valve 86 closed, until the upper level $N_2$ is reached. The pump 81 is then switched on and the valve 86 is opened.

The sludge separator 4 is now operated continuously. The rate of discharge (volume per unit time) of the wash liquid from the central region, which has a low content of pollutants, of the container 41 via the line 33 and the rate of discharge of the pollutants suspension enriched with settling slurry, i.e. slurry having a density of more than 1, through the line 13 added to each other are somewhat greater than the rate at which the wash liquid flows into the container 41 through the line 42.

As a result thereof and of the evaporation, which takes place in the wash tower 3, of a portion of the wash water, the level of liquid in the container falls from the upper level $N_2$ to the lower level $N_1$, the evaporated portion being removed by the off-gases. When this level has been reached, the probe 76 of the level controller 75 responds and opens the valve 91, through which fresh water passes through the line 90 into the wash tower 3, and a non-return valve 79 in a waste water feed line 78 through which waste water now flows directly through the orifice 244 into the container 41. Advantageously, the waste water used is slag-quenching water from a refuse incineration plant.

The level of liquid now rises again in the container 41 until it has reached the upper level $N_2$, whereupon the probe 77 responds and the level controller 75 closes the valves 79 and 91 again.

When the level of liquid rises up to level $N_2$, a layer of scum (density less than 1) which has collected on the surface of the liquid is pushed out upwards from the orifice 244 and runs downwards on the upper side of the conical partition 44 and through the scum outlet 43 to combine with the settling slurry in the line 13. The combined suspension of pollutants formed from the scum and the settling slurry is now pumped up by means of the pump 82 into the nozzles 19 of the evaporative cooler 1.

Preferably, the cross-sectional areas of flow of the lines 42 and 33 are so designed that, when the valve 86 in the main outlet 13 for settling slurry is closed, the amount of wash liquid which flows into the container 41 through line 42 is the same as that which flows out of the said container via line 33. The removal of pollutants suspension via line 13, and from time to time via line 43, as well as the evaporation from the wash tower 3, which both reduce the amount of liquid flowing in through line 42, thus causes the level of liquid to drop from level $N_2$ to level $N_1$ and this drop can thus be influenced primarily by means of the valve 86.

In the case of a known separator (German Auslegeschrift No. 2,408,222) only a part of the pollutants, specifically the settling slurry constituent, is conveyed into the evaporative cooler and the scum constitutent is pumped back into the wash liquid. In contrast, in the sludge separator shown in FIG. 3 both the settling slurry and the scum are separated off and back-circulation into the wash liquid is restricted to a minimum (suspension of particles of pollutants having a density of more than 1).

If a particularly large amount of scum is obtained, it is also possible to provide, in the annular space 144, a special rinsing water line (not shown), from which water is sprayed onto the outer surface of the partition 44 and rinses the scum deposited thereon into the line 43.

The settling of settling slurry from the liquid which flows through the feed line 42 into the container 41 is particularly promoted firstly by the fact that this stream of liquid is broken and divided at the deflector 45 and secondly by the fact that the liquid which then flows down on the inner wall of the outlet funnel 142 is further slowed down by the downwardly widening circumference of the funnel 142.

The throughput rate through the container 41 is very high and in practical operation of the separator 4 about eight times the capacity of the container are circulated per hour; this is in contrast to previously known plants, in which only a small stream of liquid flows into a settling container of large volume and provision is made for a correspondingly small outflow of liquid, so that each circulation of the contents of a container having an identical purifying action requires a ten times greater volume of the container, and about one or one and a half hours are as a rule required for each circulation.

Figure 4:
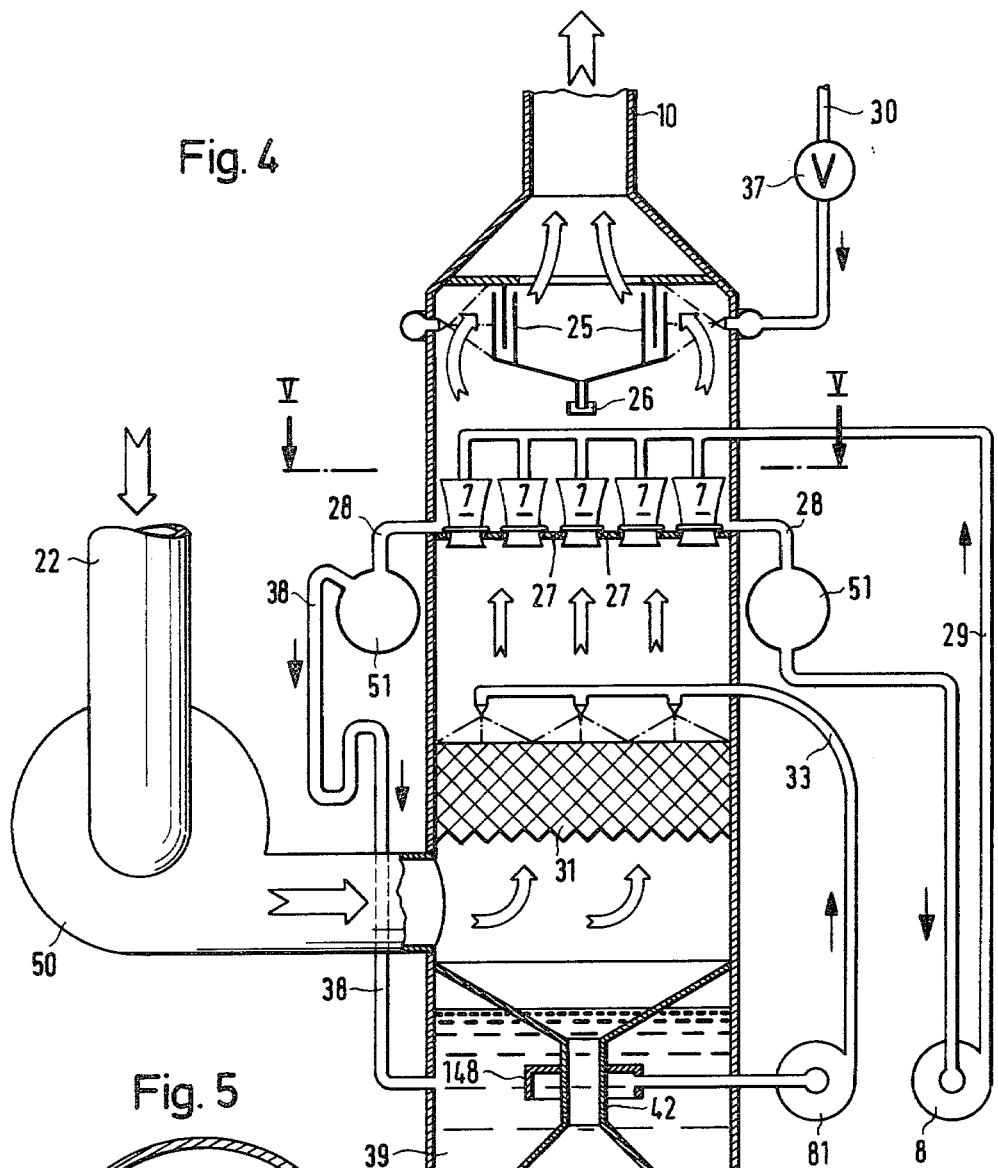
FIG. 4 is a schematic axial sectional view of a third embodiment of the scrubbing tower according to the invention.
Figure 5:
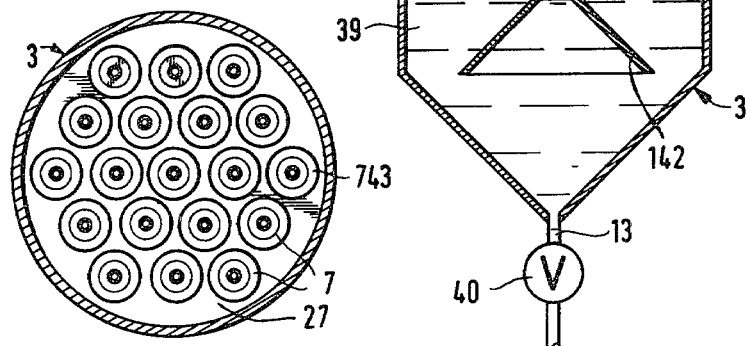
FIG. 5 is a cross-sectional view taken in a plane indicated by V—V in FIG. 4.

Referring to FIG. 4, the gas scrubbing plant comprises a lower scrubbing stage which is the first stage taken in the direction of gas flow and is provided with a layer 31 of packing bodies, and an upper stage of ring slot-defining elements 7 for washing out suspended matter. In this second stage taken in the direction of gas flow, the gases are accelerated with a corresponding steep pressure drop, to a speed of more than 30 meters per second, and then decelerated, between guide surfaces spaced less than 50 mm apart, whereupon the gases are fed to a drip catcher 25 for separating the scrubbing liquid. The gases then flow via pipe 22 to the fan 50 and then into the gas scrubbing tower 3, through which they flow upwards. They are discharged via the chimney 10. The pump 81 and the pipe 33 are used to circulate liquid through the layer 31 of packing material. The injection liquid for the separation of suspended matter is delivered to the gas pressure drop-causing ring slot-defining elements 7 by the pump 8 via the pipe 29. The liquid entrained by the gas is fed to the drip catcher 25 and then via the immersion seal 26 to the partition wall 27 and then via pipe 28 to the header 51 and back to pump 8. Water can be injected via pipe 30 and valve 37 upstream, taken in the direction of gas flow, of the drip catcher 25. The addition of water results in a rise in the level of liquid in the header 51, so that liquid flows off via the overflow pipe 38 to the sump 39. The outlet funnel 142 improves the sludge separation in the sump 39. The sludge that has settled out is removed from the scrubbing system via the pipe 13 and the valve 40. Hedgehog packings according to German Offenlegungsschrift No. 24 16 955, for example, are suitable packings for the layer 31 of the first scrubbing stage. However, moving packings may alternatively be used in the packed scrubbing layer 31, e.g. spherical plastic packings of the kind already in use in the aluminum industry.

A drip catcher of the type described in German Offenlegungsschrift No. 23 24 520 is particularly suitable as a drip catcher 25.

In the scrubbing tower according to the invention, slotdefining gas-baffling elements, especially those defining an annular slot which are designated by reference numeral 7, are used to accelerate and then decelerate the gases. Each element 7 comprises as inner substantially conical portion 742 whose surface approximates to a paraboloid and an outer portion 741 whose surface approximates to a hyperboloid so that an annular passage 743 for gas is formed which from the entrance narrows and then widens towards the gas outlet, that is to say, the radii of the passage increases towards the gas outlet. The gas baffling element 7 contains a tube 744 though which liquid flows in opposition to the direction of flow of the gas. An annular liquid exit slot 745 is situated at the end of the tube 744.

The annular jet of liquid rebounds on the liquid deflector disc 746, where it forms a rotationally symmetrical film of liquid before being sprayed into the gas flowing into the element 7. The breaking up of the jet of liquid into the form of a surface gives a homogeneous distribution of the liquid at the place of the maximum gas speed. This ideal liquid distribution is obtained despite minimum pressure utilization in the distribution system. A pressure of about 0.5 bar in the tube 744 is quite sufficient. The minimum spacing between the inner and outer conical gas-baffling surfaces 741 and 742 in FIG. 6 is less than one-fifth of the length of the gas path measured from the outer edge of the liquid deflector disc 746 to the exit from the gas-baffling element 7.

It has been found advantageous to use a high gas speed in the gas scrubber stage 31. The gas speed should be in excess of 1.5 meters per second, referred to the free cross-section of the scrubber.

It is advisable to provide the maximum possible number of gas baffling elements 7 in order to break the gas flow up into numerous thin sub-flows. Very high separation efficiencies are achieved if the minimum spacing between the inner and outer conical gas-baffling surfaces 741 and 742 is less than 3 cm.

To reduce the resistance to flow and minimize the space requirements, the conical annular duct 743 formed by the two gas-baffling surfaces 741 and 742 has an average diverging angle $\alpha$ of about 10° to 90°, preferably about 10° to 20°, referred to the inlet as shown in FIG. 6.

A spray nozzle of similar type to that built in the slot-defining element 7 has been described in U.S. Pat. No. 3,737,106 to O. M. Arnold et al.

Measurements have shown that intensive injection of liquid improves separating efficiency. The injection of more than 2 liters of liquid through the annular exit slot 745 per $Nm^3$ of gas gives a considerable increase in separating efficiency.

With the invention it is possible to purify the gas flow in a number of identical gas baffling elements 7. These elements can be mass produced, plastics such as polypropylene or polyethylene being particularly advantageous. Thermoplastics of this kind can be injection moulded and a plurality of parts produced in this way can be combined to construct a gas baffle. This type of production results in surprisingly low costs compared with other gas scrubbing systems.

In the purification of waste gases from furnaces for electrolytic aluminum production it has been found that the waste gas purity obtainable in a scrubber according to the invention with a pressure of 30 mbar could not be obtained in known venturi scrubbers except at a pressure of above 50 abar. With the large gas flows requiring purification, this means a considerable saving in electrical power costs.

As mentioned hereinbefore, the pH value of the wash liquids in the circulating lines 33 and 29 is preferably adjusted to below 4. This is done by introducing, for instance calcium hydroxide solution (lime water) or a chemically equivalent solution, e.g. of magnesium hydroxide, into line 33, and sodium hydroxide solution, or a chemically equivalent solution, such as that of potassium hydroxide, into line 29. The acidic pH of the liquid in line 29 is preferably higher than that in line 33.

Figure 9:
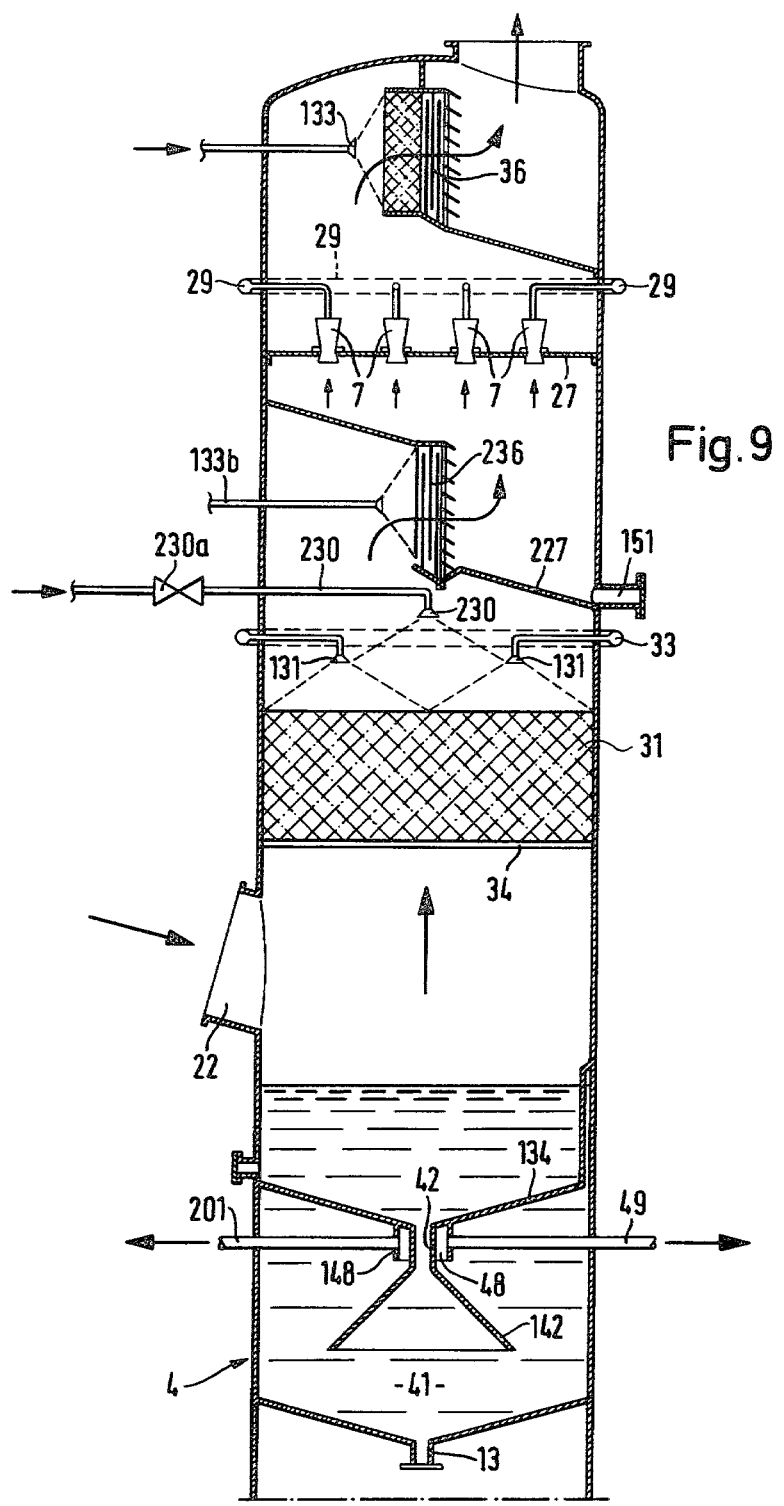
FIG. 9 is a schematic view of another gas purification plant, comprising a fourth, particularly preferred embodiment of the scrubbing tower according to the invention.

In the embodiment of the scrubbing tower according to the invention shown in FIG. 9 like parts show the same reference numerals as in the preceding figures.

The only structural element which is not present in the scrubbing towers shown in FIGS. 1, 2 and 4 is a partition wall 227 between the first wash stage of packing layer 31 and the slot-defining elements 7, which partition is equipped with a drip catcher 236. This prevents undesirable mixing of the two cycles of wasting liquid one of which passes through line 33 and irrigates the packing layer 31, while the other cycle passes through line 29 and the slot-defining elements 7. Feed line 230 controlled by valve 230a is an emergency line supplying cooling water when the temperature of the gas entering the scrubbing tower is too high.

FIG. 10 illustrates a gas purification plant, similar to that shown in FIGS. 1 and 2, in which the scrubbing tower of FIG. 9 has been installed.

Again, like numerals indicate parts similar in structure and operation to those shown in FIGS. 1 and 2.

As in FIG. 4, the fan 50 is located in the gas feed line 22 leading to the scrubbing tower, and, in order to reduce the temperature of the gas, which is still held above the acid dew point i.e., at least above 160° C., when passing through the cyclone 2, before the gas enters the scrubbing tower, there is provided a quench 200, which if fed via a line 201 with wash liquid taken from the central upper region of the sludge separator 4, which line preferably has its entry opening in the casing 148 about the inlet tube 42 of the sludge separator 4. If necessary, water can be fed in additionally through emergency line 230.

While, in the plant of FIG. 1, the gas is suctioned at slightly reduced pressure through the scrubbing tower due to the fact that the fan 5 is located downstream of the scrubbing tower in the line of gas flow, in the plants of FIGS. 4, 9 and 10, the gas is introduced under slight excess pressure into the scrubbing tower, due to the fact that the fan 50 is located in the gas flow upstream of the scrubbing tower.

As in the case of the plant shown in FIG. 1, the wash liquid emerging from the second washing stage which, in that plant, is equipped with X-slot separator elements 135, but is equipped with ring-slot elements 7 in the scrubbing tower of FIGS. 9 and 10, is drawn off into a collection vessel 92. However, while part of this drawn off wash liquid is recycled through line 29 (FIG. 4) into the second washing stage, after addition of sodium hydroxide solution via line 129, in order to increase its acid pH to 4 or slightly thereabove in the acid range, the remaining portion of this wash liquid is drawn off from the bottom of settling tank 92 and introduced via line 93 into the evaporative cooler 1.

Whenever the gas emerging at the top of the scrubbing tower through outlet 32 is found to require additional scrubbing, for instance because its content of acidic gaseous pollutants is still slightly too high for release into chimney 10, it can be returned via gas return line 110 into the scrubbing tower, preferably into the liquor collected in the sludge separator.

In order to adjust the pH of the wash liquid circulating through the first washing stage, to the preferred acid range of about 2 to 3, lime water can be added via line 333 to the liquid passing through line 33. Water is injected via line 30 to wash drip catcher 25, and through branch line 130 and valve 137 to wash drip catcher 236.

As can be seen from the figures of the drawing, the slurry obtained in the gas scrubber is sprayed, optionally after adding milk of lime, into a reactor (evaporative cooler) and dried by coming into contact with the flue gases which are at a temperature above 200° C. and which leave a boiler in which they had to give up a large proportion of their thermal energy. The finely sprayed slurry binds the major portion of the dust content of the crude gases and, as a result of this binding, the gas contains only a small amount of dust at the outlet of the downstream cyclone 2. The circulating liquid in the downstream scrubber remains relatively pure because adjustment to an optimum temperature in reactor 1 and corresponding control of the composition of the wash liquid make it possible to separate off the slurry virtually completely in the sedimentation apparatus (sludge separator) 4.

When the plant has been in operation for several months, no troublesome incrustations or caking in the wash system or baking on of dust in the dry pre-purification (cyclone 2) are observed.

When the flue gases from a municipal refuse incineration plant were purified, the following advantageous results were obtained, without an expensive electrofilter being required:

Content of pollutants in the purified off-gas to be released into the atmosphere:

Dust content reduced to below 50 mg/Nm$^3$ (measured after gas cooling)
Free hydrochloric acid less than 5 mg/Nm$^3$
Total chloride content (as Cl$^-$) less than 15 mg/Nm$^3$
SO$_2$ less than 100 mg/Nm$^3$
Nitrogen oxides less than 100 ppm.

Furthermore, the following advantages were obtained:

Utilisation of the temperature of the flue gas (after the boiler) for drying the slurries obtained in the gas scrubber and for removing the slag-quenching water from the incineration plant.
Conversion of all precipitated pollutants to a free-flowing ash. Low consumption of water (less than 50 kg/1,000 Nm$^3$ of flue gas)
Very low consumption of milk of lime (less than 50 g of Ca(OH)$_2$/1,000 Nm$^3$ of flue gas)
Low expenditure of energy by virtue of the use of a X-separator for separating off the aerosols (fan differential pressure less than 360 mm of water column).

We claim:

1. A gas scrubbing tower having a top region, a sump region and at least two washing stages therebetween, which tower comprises
   (A) a gas entry means for introducing waste gas to be scrubbed into the tower, which entry means is located between the sump region and the first of said washing stages,
   (B) gas exit means in the top region of the tower for the discharge of purified gas therefrom,
   (C) the first washing stage, in the direction of upward gas flow from said entry means to said exit means, being constituted by at least one layer of packing elements, which layer extends in a horizontal plane across the cross-sectional area of the tower, and by supporting means for said packing elements,
   (D) a first circulating line for conducting wash liquid from said sump region to the first washing stage, said first line being connected to said sump region, passing through pump means, and terminating in spray nozzles which are positioned in said first washing stage above said packing elements for irrigating said layer of packing elements therein,
   (E) a second, packing-free washing stage, located in said scrubbing tower above said first washing stage,
   (F) a second circulating line for conducting wash liquid from the sump region to the second washing stage, said second line being connected between said sump region and said second washing stage and opening into the latter;
   (G) a sludge separator, constituting the said sump region of the tower, and comprising a settling vessel having an upper portion, a central portion and a base portion, the upper portion comprising an upper inner partition wall which tapers conically inwardly and with its apex downwardly to define a central orifice; an inlet tube for sludge-carrying liquid from said first washing stage and extending via the central orifice into the central portion of the settling vessel and connected therebetween, said inlet tube having mounted on the lower open end thereof in said sludge separator a conical funnel which widens downward and a deflector mounted in said funnel opposing the flow of liquid therethrough; a first outlet means from the settling vessel and extending from the central portion of the settling vessel, above the lower end of the liquid inlet tube radially toward the outside as part of said first circulating line, said first outlet means comprising a conduit having an intake opening and a cup-shaped casing positioned about said inlet tube and containing in its bottom said intake opening of said conduit, said conduit thus being adapted for receiving wash liquid rising along the outside of said conical funnel; and a second outlet means connected to the base portion of the settling vessel for the removal therefrom of liquid charged with sediment; and (H) conduit means for introducing water from outside the tower into said scrubbing tower.

2. The scrubbing tower of claim 1, wherein said sludge separator further comprises an inner annular baffle underneath said upper inner partition, which baffle tapers conically inwardly with its apex pointing upwardly and defining a central baffle orifice through which said inlet tube for liquid extends downwardly from said central orifice in said upper inner partition wall, while an annular gap being a part of said central baffle orifice is left free about said inlet tube of said sludge separator, thereby permitting overflow of scum-free or scum-carrying liquid through said gap and over the outer surface of said baffle.

3. The scrubbing tower of claim 2, further comprising a two-position level controller, between two levels in said settling vessel of said sludge separator, of which the lower level lies a short distance above the point at which said intake opening of said first outlet means opens into said settling vessel, while the upper level lies a short distance below the orifice of said conically tapered partition of the settling vessel, said level controller being adapted for keeping the level of liquid between said two levels in the settling vessel.

4. The scrubbing tower of claim 3, wherein said sludge separator further comprises a scum outlet tube connected to said outlet means for liquid charged with sediment.

5. The scrubbing tower of claim 2, further comprising a two-position level controller, between two levels in said settling vessel of said sludge separator, of which the lower level lies a short distance above the point at which said intake opening of said first outlet means opens into said settling vessel, while the upper level lies at the orifice of said conically tapered baffle of the settling vessel, said level controller being adapted for keeping the level of liquid between said two levels in the settling vessel.

6. A gas scrubbing tower having a top region, a sump region and at least two washing stages therebetween which tower comprises (A) a gas entry means for introducing waste gas to be scrubbed into the tower, which entry means is located between the sump region and the first of said washing stages, (B) gas exit means in the top region of the tower for the discharge of purified gas therefrom, (C) the first washing stage, in the direction of upward gas flow from said entry means to said exit means, being constituted by at least one layer of packing elements, which layer extends in a horizontal plane across the cross-sectional area of the tower, and by supporting means for said packing elements, (D) a first circulating line for conducting wash liquid from said sump region to the first washing stage, said first line being connected to said sump region, passing through pump means and terminating in spray nozzles which are positioned in said first washing stage above said packing elements for irrigating said layer of packing elements therein, (E) a second, packing-free washing stage, located in said scrubbing tower above said first washing stage, and comprising a plurality of slot-defining gas baffling elements adapted for accelerating and then decelerating gas flow therethrough, and means for introducing a liquid into said elements, wherein each said element has a slot inlet thereto and a slot outlet therefrom and includes two coaxial guide surfaces defining an annular passage diverging from the slot inlet toward the slot outlet, the mean angle of divergence being in the range of 10° to 90°, and the cross-sectional area of the annular passage decreasing in the direction of gas flow from the slot inlet and then increasing towards the slot outlet and the mean radius of the cross-sectional area increasing in the direction towards the slot outlet, the liquid introduction means including means to produce a rotationally symmetrical liquid jet substantially parallel to said guide surfaces and in the same direction as the flow of gas through each element and comprising a deflector disc centrally disposed on the gas inlet side of said element and an axial feed tube through which liquid is fed onto the deflector disc in a direction opposite to that of the gas flow and is then deflected by the deflector disc rotationally symmetrically into the direction of the gas flow;

(F) a second circulating line for conducting wash liquid from the sump region to the second washing stage, said second line being connected between said sump region and said axial feed tube of said second washing stage;

(G) a sludge separator, constituting the said sump region of the tower, and comprising a settling vessel having an upper portion, a central portion and a base portion, the upper portion comprising an upper inner partition wall which tapers conically inwardly and with its apex downwardly to define a central orifice; an inlet tube for sludge-carrying liquid from said first washing stage and extending via the central orifice into the central portion of the settling vessel and connected therebetween, a first outlet means for removal of liquid of reduced sludge content from the settling vessel and extending from the central portion of the settling vessel, above the lower end of the liquid inlet tube radially toward the outside as part of said first circulating line, and a second outlet means connected to the base portion of the settling vessel for the removal therefrom of liquid charged with sediment; and (H) conduit means for introducing water from outside the tower into said scrubbing tower.

* * * * *